(12) United States Patent
Choi

(10) Patent No.: US 9,483,492 B2
(45) Date of Patent: Nov. 1, 2016

(54) TERMINAL AND METHOD FOR PROVIDING APPLICATION-RELATED DATA

(71) Applicant: Pantech Co., Ltd., Seoul (KR)

(72) Inventor: Hyeong Jae Choi, Seoul (KR)

(73) Assignee: Pantech Co., Ltd., Seoul (KR)

( * ) Notice: Subject to any disclaimer, the term of this patent is extended or adjusted under 35 U.S.C. 154(b) by 207 days.

(21) Appl. No.: 14/245,577

(22) Filed: Apr. 4, 2014

(65) Prior Publication Data

US 2014/0304313 A1    Oct. 9, 2014

(30) Foreign Application Priority Data

Apr. 5, 2013    (KR) .................. 10-2013-0037579

(51) Int. Cl.
  *G06F 17/30*    (2006.01)
(52) U.S. Cl.
  CPC .............. *G06F 17/30194* (2013.01)
(58) Field of Classification Search
  CPC .................................. G06F 17/30174
  See application file for complete search history.

(56) References Cited

U.S. PATENT DOCUMENTS

| | | | | |
|---|---|---|---|---|
| 8,136,085 B2* | 3/2012 | Skillman | ............... | G06F 9/4411 710/31 |
| 2006/0031384 A1* | 2/2006 | Manders | ........... | G06F 17/30038 709/217 |
| 2010/0042580 A1* | 2/2010 | Cheng | ..................... | G06F 17/30 707/781 |
| 2011/0158138 A1* | 6/2011 | Vivek | ................... | G06F 13/385 370/310 |
| 2013/0268929 A1* | 10/2013 | Tyhurst | ................. | G06F 9/4411 718/1 |
| 2015/0339242 A1* | 11/2015 | Huang | ................... | G06F 13/38 710/74 |

FOREIGN PATENT DOCUMENTS

| | | |
|---|---|---|
| KR | 10-2009-0047136 | 5/2009 |
| KR | 10-2010-0092848 | 8/2010 |

* cited by examiner

*Primary Examiner* — Khanh Pham
(74) *Attorney, Agent, or Firm* — H.C. Park & Associates, PLC

(57) ABSTRACT

A method for providing application-related data includes connecting a mobile terminal and a device, determining an object displayed on the mobile terminal, determining a data file associated with the object, and controlling the data file associated with the object to be accessible by the connected device and controlling information of the data file to be displayed on a display of the connected device according to the determination of the object. A terminal that provides application-related data includes a connection unit connecting the terminal and another device to each other; and a synchronization unit, when the connection unit is connected to the another device, synchronizing related data of an application that is in the middle of execution in the terminal or an application selected by a user after the connection with the another device.

17 Claims, 16 Drawing Sheets

TERMINAL AND METHOD FOR PROVIDING APPLICATION-RELATED DATA

CROSS-REFERENCE TO RELATED APPLICATION

This application claims priority from and the benefit under 35 U.S.C. §119 of Korean Patent Application No. 10-2013-0037579, filed on Apr. 5, 2013, which is hereby incorporated by reference in its entirety for all purposes as if fully set forth herein.

BACKGROUND

1. Field

The present disclosure relates to a terminal and a method for providing a file inside the terminal, and more particularly, to a terminal and a method for providing file-related data inside the terminal through an accessed application.

2. Discussion of the Background

Terminals that are recently available in the market can perform a variety of operations, such as reproduction and storage of multimedia contents. For example, by integrating a camera function, a document management function, a motion picture reproduction function, and the like into terminals, the terminals can create and store image files, text files, motion picture files, and the like or can download such files through a communication network and reproduce the files. In addition, since there are various types of applications performing such functions, various types of files are stored in a terminal, and the files to be stored are stored in various spaces and different folders of the terminal in a distributed manner. In order to manage various files stored in the terminal, a file management application stored in the terminal is used, or the terminal is connected to a personal computer (PC), and files stored in the terminal are managed by using the PC. For example, when a file stored in a terminal is desired to be copied into a PC, the terminal is connected through a wired connection cable, e.g., a universal serial bus (USB) type connection cable, the location of the file to be copied is checked, and the file is copied into the PC.

FIG. 1 is a configuration diagram of a PC and a terminal when the terminal and the PC are connected through a USB connection cable. The PC and the terminal are connected to each other, and files stored in the terminal may be searched and managed in the PC. However, since there are many applications, system files, folders, and the like, it may not be easy for a user to search for a file from among the files stored in the terminal by using a search operation of the PC.

In a case where folders and files stored in the mobile terminal are to be copied into the PC, only folders and files that are designated in accordance with the protocol according to a PC-to-terminal connection type may be accessible. As illustrated in FIG. 1, many folders and files designated in accordance with the protocol according to a USB connection appear on a window of an external drive or external device corresponding to the terminal. In such a case, it may be difficult for a user to search for a location at which a folder or a file desired by the user exists in the terminal. For example, when pictures photographed last summer are to be copied into the PC, the user may need to remember a path in which the corresponding image files are stored or to check individual folders.

Further, in a file management system of a conventional terminal, a specific folder is arbitrarily created in accordance with a configuration of an application, and the interface of the terminal provides an access method that is mainly based on the application, which is different from a personal computer in which an access is made based on files and folders. Accordingly, since it is more difficult to check the source of each folder from user's standpoint, a problem of a malfunction of the terminal may occur due to user's erroneous deletion of a specific folder related to the driving of the system through a file manager. Thus, in a mobile platform, it may not be easy for a user to check the functions and operations of various folders and files, which are stored in the terminal, inside the terminal and applications with which such folders and files are associated, and accordingly, the above-described problem may occur.

In a case where an application is installed to a conventional terminal of Android™ mobile platform, an application file is stored in the form of "*.apk" in "/system/Application" or "/data/application" through a package manager, and installation-related files are stored together. In addition, new files may be created and stored through the application (for example, a picture file generated using a camera application). In other words, various files relating to a specific application may be generated and stored in the terminal, and such files may be stored at various locations having different paths.

Nevertheless, only files stored in a designated area at the time of installation of applications are managed by a package manager, and files stored in a portion other than the designated area are not separately managed. Thus, detailed management of all the files stored in the terminal is not performed, and there is a problem that files occupying a part of the storage area are not recognizable to a user and thus are neglected. Further, although an application is uninstalled, several folders and/or files generated by the uninstalled program remain in different locations without deletion. Thus, memories and files may not be effectively managed by simply uninstalling applications.

Further, when an external device is connected to a mobile terminal, a real-time file mounting has not been provided for a convenient access to files and folders of the mobile terminal in accordance with a selection of an object displayed on the mobile terminal.

SUMMARY

The present disclosure relates to a terminal and a method that enable selective searching for a file associated with an application from among files stored in the terminal and maintenance of a file-application relation.

Additional features of the invention will be set forth in the description which follows, and in part will be apparent from the description, or may be learned by practice of the invention.

Exemplary embodiments of the present invention provide a method that uses a controller to provide application-related data, the method including: connecting a mobile terminal and a device; determining an object displayed on the mobile terminal; determining a data file associated with the object; and controlling, by the controller, the data file associated with the object to be accessible by the connected device and controlling information of the data file to be displayed on a display of the connected device according to the determination of the object.

Exemplary embodiments of the present invention provide a mobile terminal to provide application-related data, including: a connector to connect to a device; and a controller to determine an object displayed on the mobile terminal, to determine a data file associated with the object, to control the data file associated with the object to be accessible by the connected device, and to control information of the data file to be displayed on a display of the connected device according to the determination of the object.

Exemplary embodiments of the present invention provide a device to provide application-related data, including: a connector to connect to a mobile terminal; and a controller to mount a mounting directory of the mobile terminal, to determine a data file associated with an object from the mounting directory, to control the data file associated with the object to be mounted to the device, and to control information of the mounted data file to be displayed on a display of the device according to the determination of the object. The object is displayed on the mobile terminal, and contents stored in the mounting directory are changed according to the determination of the object.

It is to be understood that both forgoing general descriptions and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
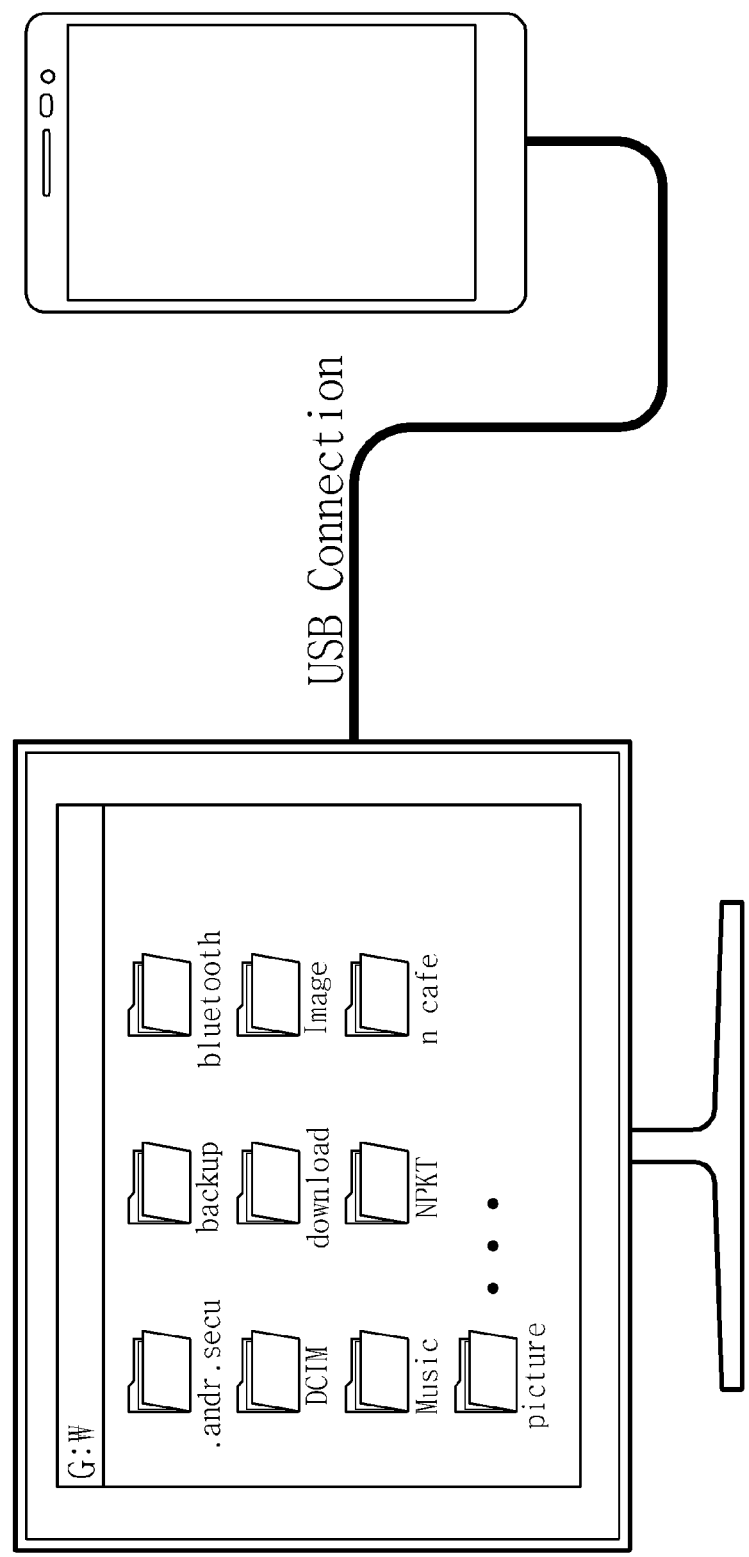
FIG. 1 is a configuration diagram of a PC and a mobile terminal connected through a Universal Serial Bus (USB) connection cable.

Exemplary embodiments now will be described more fully hereinafter with reference to the accompanying drawings, in which exemplary embodiments are shown. The present disclosure may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art. In the description, details of well-known features and techniques may be omitted to avoid unnecessarily obscuring the presented embodiments. Throughout the drawings and the detailed description, unless otherwise described, the same reference numerals will be understood to refer to the same respective elements, features, and structures. The relative size and depiction of these elements may be exaggerated for clarity, illustration, and convenience.

The terminology used herein is for the purpose of describing particular embodiments only and is not intended to be limiting of the present disclosure. It will be understood that for the purposes of this disclosure, "at least one of X, Y, and Z" can be construed as X only, Y only, Z only, or any combination of two or more items X, Y, and Z (e.g., XYZ, XZ, XYY, YZ, ZZ). As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

An embodiment described here may have an aspect that is implemented entirely by hardware, partially by hardware and partially by software, or entirely by software. In description here, a "unit", a "module", a "system", or the like denotes a computer-related entity that is implemented by hardware, a combination of hardware and software, software, or the like. For example, in the description here, a unit, a module, a system, or the like may be a process that is in the middle of execution, a processor, an object, an executable file, a thread of execution, a program, and/or a computer, but is not limited thereto. For example, a combination of an application that is executed in a computer and the computer may correspond to a unit, a module, an apparatus, a system, or the like described here.

Exemplary embodiments have been described with reference to a flowchart illustrated in the drawings. While the method is illustrated and described as a series of blocks for the simplification of the description, the present disclosure is not limited to the order of the blocks. Thus, some blocks may be performed in an order different from that described and illustrated here or simultaneously, and various other branching, flow paths, and orders of blocks achieving the same result or a result similar thereto may be implemented. In addition, not all the illustrated blocks may not be required for realizing the method described here. Furthermore, a method according to an exemplary embodiment of the present invention may be realized in the form of a computer program for executing a series of procedures, and the computer program may is be recorded on a computer-readable recording medium.

Hereinafter, exemplary embodiments of the present disclosure will be described in detail with reference to the drawings.

Figure 2:
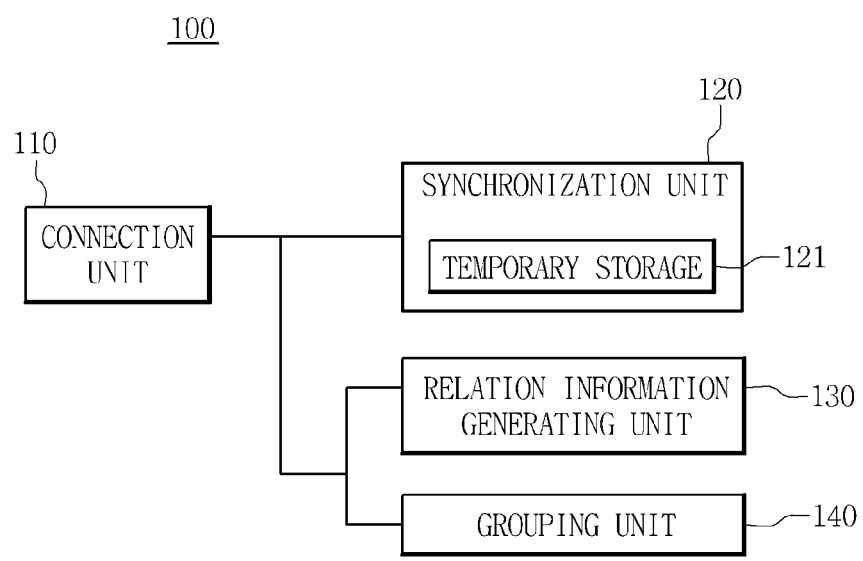
FIG. 2 is a configuration diagram of a terminal that provides associated files stored in the terminal through an accessed application according to an exemplary embodiment of the present invention.

FIG. 2 is a configuration diagram of a terminal that provides associated files stored in the terminal through an accessed application according to an exemplary embodiment of the present invention. As illustrated in FIG. 2, the terminal 100 to provide application-related data may include a connection unit 110, a synchronization unit 120, a relation information creating unit 130 (or relation information generating unit 130), and a grouping unit 140. However, not all the constituent elements are necessarily included in the terminal, and some of the constituent elements may be excluded in some embodiments.

Figure 3:
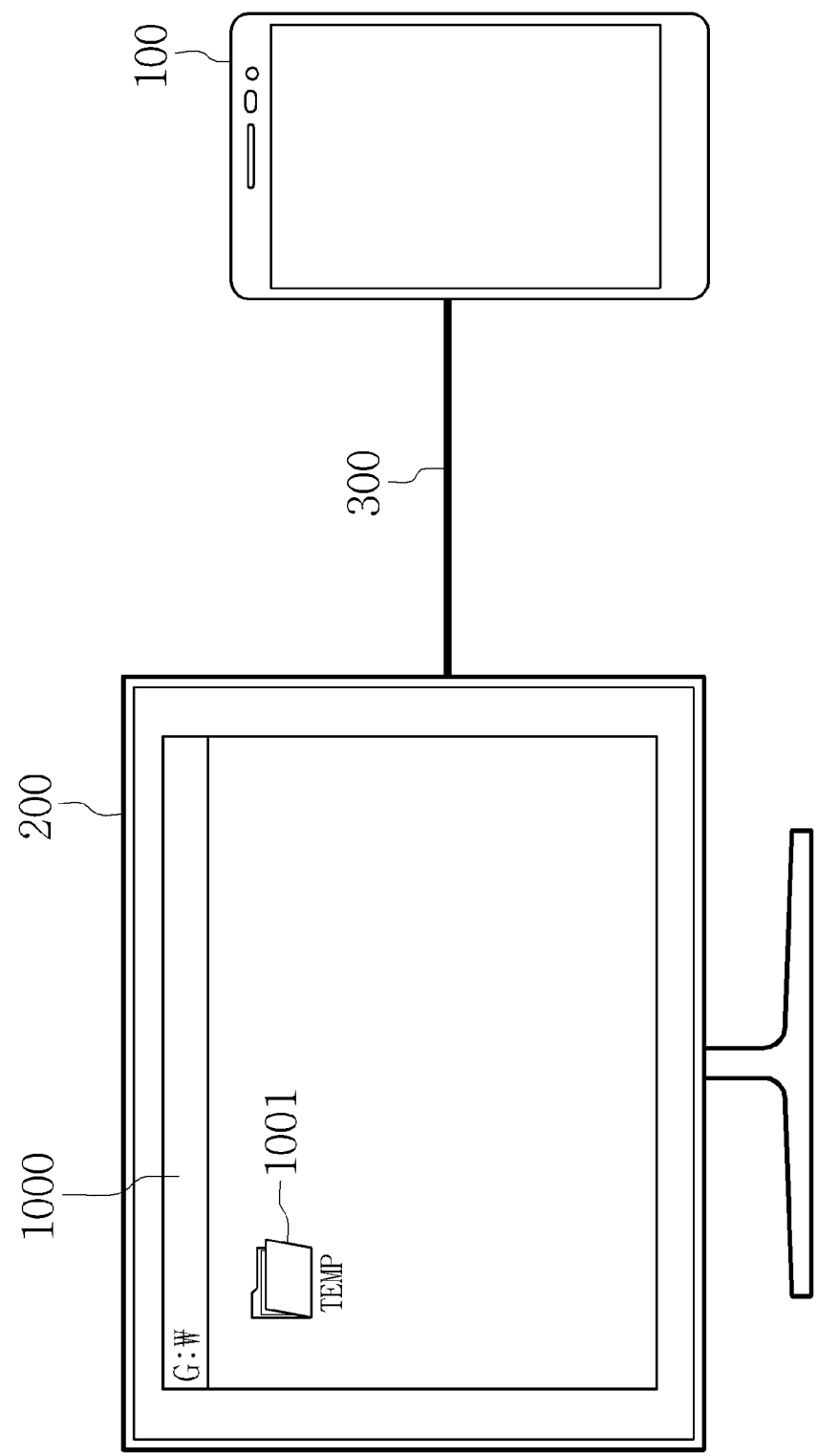
FIG. 3 is a configuration diagram of a device connected to a mobile terminal according to an exemplary embodiment of the present invention.

FIG. 3 is a configuration diagram of a device connected to a mobile terminal according to an exemplary embodiment of the present invention. FIG. 3 will be described based on the configuration of the terminal illustrated in FIG. 2. However, the terminal configuration may be changed. As illustrated in FIG. 3, the connection unit 110 of the terminal 100 may be connected to a device 200 through a wired or wireless network 300. For example, in a case where a wired network is used, the connection unit 110 may be connected to the device 200 through a universal serial bus (USB), and Media Transfer Protocol (MTP) protocol may be used through the USB. The device 200 may be a smartphone, a tablet personal computer (PC), an electronic book, a notebook computer, a desktop computer, or the like. Hereinafter, the device 200 will be described as a PC for description, but it is not a limiting example.

As illustrated in FIG. 3, an external drive (G drive (G:\)) corresponding to the terminal 100 appears in a search window 1000 on the screen of the device 200. A user may search for, copy, move, and/or delete files and folders stored in the terminal 100 through the G drive displayed in the device 200.

In connecting two devices and the file systems, when the terminal 100 and the device 200 are connected to each other, a transmission protocol is set between the two devices. Then, the device 200 may access files and folders stored in the terminal 100 in accordance with a protocol according to the connection method. The types and the range of data that may be shared between the two devices may differ in accordance with the connection protocol that is based on the connection method. More specifically, the range of files accessible from another device differs depending on the type of the connection protocol.

When the connection unit 110 of the terminal 100 is connected to another device, the synchronization unit 120 may extract related data of an application that is in the middle of execution in the terminal 100 or an application selected by a user after the connection and synchronization of the extracted related data with the other device.

The synchronization unit 120 may include a temporary storage 121. The temporary storage 121 is an arbitrary storage space in which data (files, folders, and the like) can be stored inside the terminal 100 and may be represented as a folder. In addition, the temporary storage 121 may be created or disappear in accordance with a connection state between the terminal and the connected device. For example, the temporary storage may be created when a connection between the terminal and the device is established, and the temporary storage may disappear when disconnected.

The synchronization unit 120 may synchronize the extracted related data with the connected device by using the temporary storage 121. For example, the synchronization unit 120 may move or copy the related data into the temporary storage 121 inside the terminal 100.

If a mounted folder set in advance exists in the terminal 100, the synchronization unit 120 may release the mounted folder and convert the temporary storage into a basic mounted folder. When the terminal 100 is connected to the device, the mounted folder may represent a folder represented as a top-level folder of the terminal 100 in the connected device. Such a mounted folder may be set differently depending on the connection protocol.

For example, if a folder including many folders that are not arranged as illustrated in FIG. 1 is set as a mounted folder, in order to provide only a folder including files necessary to the user, the synchronization unit 120 may convert the temporary storage 121 into a basic mounted folder of the terminal 100.

When the temporary storage 121 is set as a basic mounted folder, in response to a search of the terminal 100 performed by the connected device 200, the temporary storage appears as a top-level folder. In the search window 1000 illustrated in FIG. 3, folder "TEMP" 1001 is a folder representing a temporary storage 121 of FIG. 2.

Unlike FIG. 3, folder "TEMP" may not exist at the root (top-level folder) of the G drive, and lower-level contents of folder "TEMP" may be displayed at the root of the G drive. If the temporary storage 121 is not set as a basic mount, various folders other than folder "TEMP" may be displayed in the search window 1000 illustrated in FIG. 3.

The related data may be an installation file, a creation file, a log file, and a folder of an application that is in the middle of execution inside the terminal or an application selected by the user after the connection. Further, the related data may be a file or a folder selected by the user from among files or folders displayed in the terminal. The displayed files may be files of at least one type of an execution file, an image file, a music file, a motion picture file, a flash file, and a text file.

The synchronization unit 120 may execute an application in response to a user input or may access an application folder selected through a file manager provided inside the terminal 100.

Figure 4A:
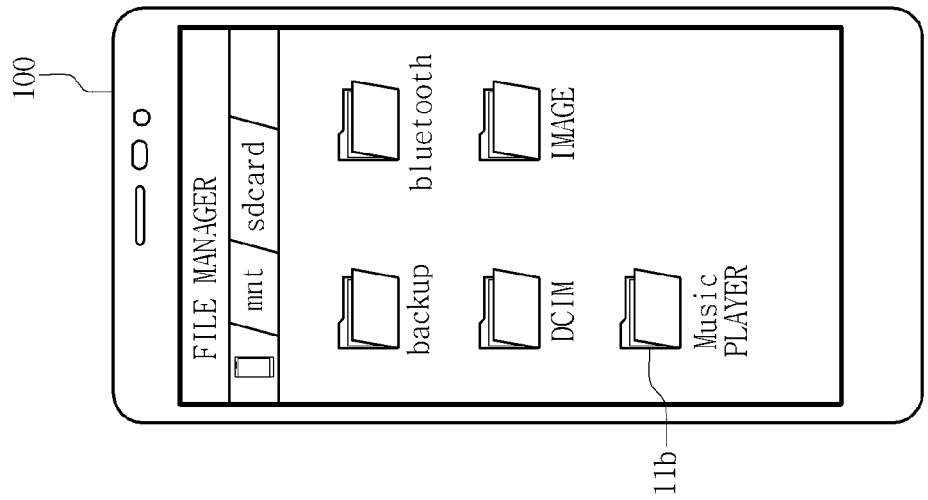
FIG. 4A and FIG. 4B are configuration diagrams illustrating a method of accessing an application according to an exemplary embodiment of the present invention.
Figure 4B:
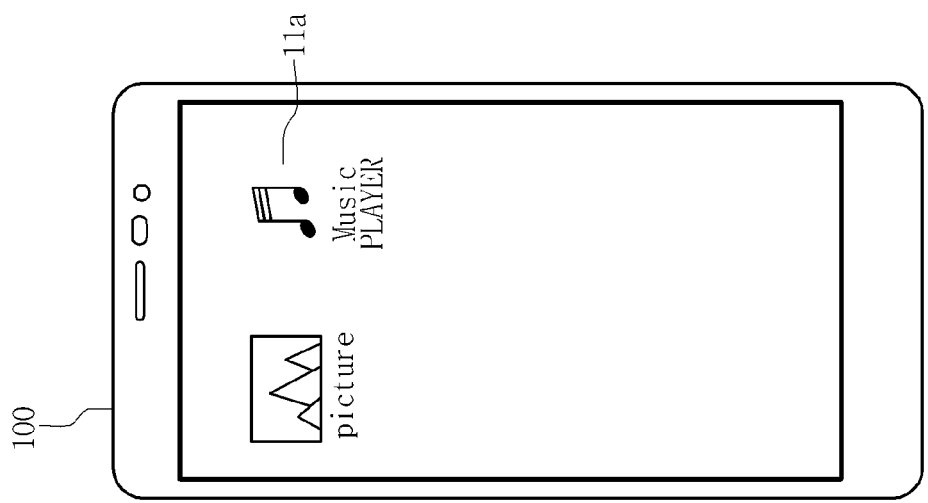

FIG. 4A and FIG. 4B are configuration diagrams illustrating a method of accessing an application in response to a user input using the synchronization unit 120 of FIG. 2.

Referring to FIG. 4A, if the user touches an icon 11a of an application "Music Player" that plays music using the application, an application access unit, e.g., the synchronization unit 120 of FIG. 2, may execute the application "Music Player" in response to the user input, such as the touch.

As illustrated in FIG. 4B, folder "Music Player" 11b included in folder "Sdcard" appears through the file manager. Folder "Music Player" 11b is a folder that is created by installing application "Music Player" and may include main music files relating to the execution of application "Music Player". When the user selects folder "Music Player" 11b, the application access unit 120 may access the selected folder. When folder "Music Player" 11b is accessed, lower-level folders and files of the folder 11b are displayed in the file manager. Here, the file manager may be an application capable of searching for files and folders stored in the terminal 100.

As described above, the function of the access unit has been described for an application playing music as an example. Another application other than or including the application playing music may be installed in the mobile terminal 100, and an access to the application through the file manager may be included in the function of the application access unit 120.

Figure 5A:
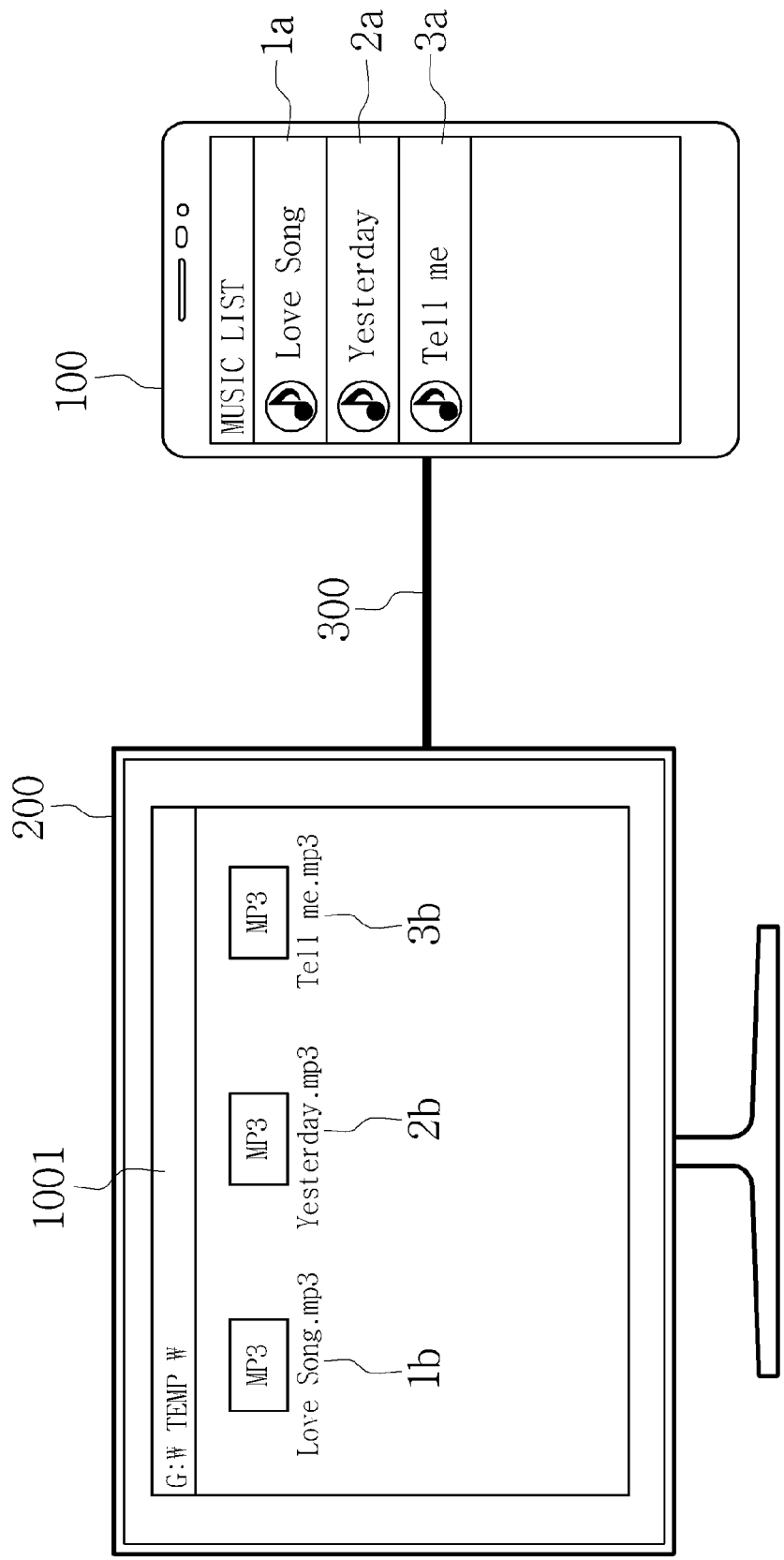
FIG. 5A and FIG. 5B are configuration diagrams of another device and a terminal illustrating the generation of related data or synchronization data according to an exemplary embodiment of the present invention.
Figure 5B:
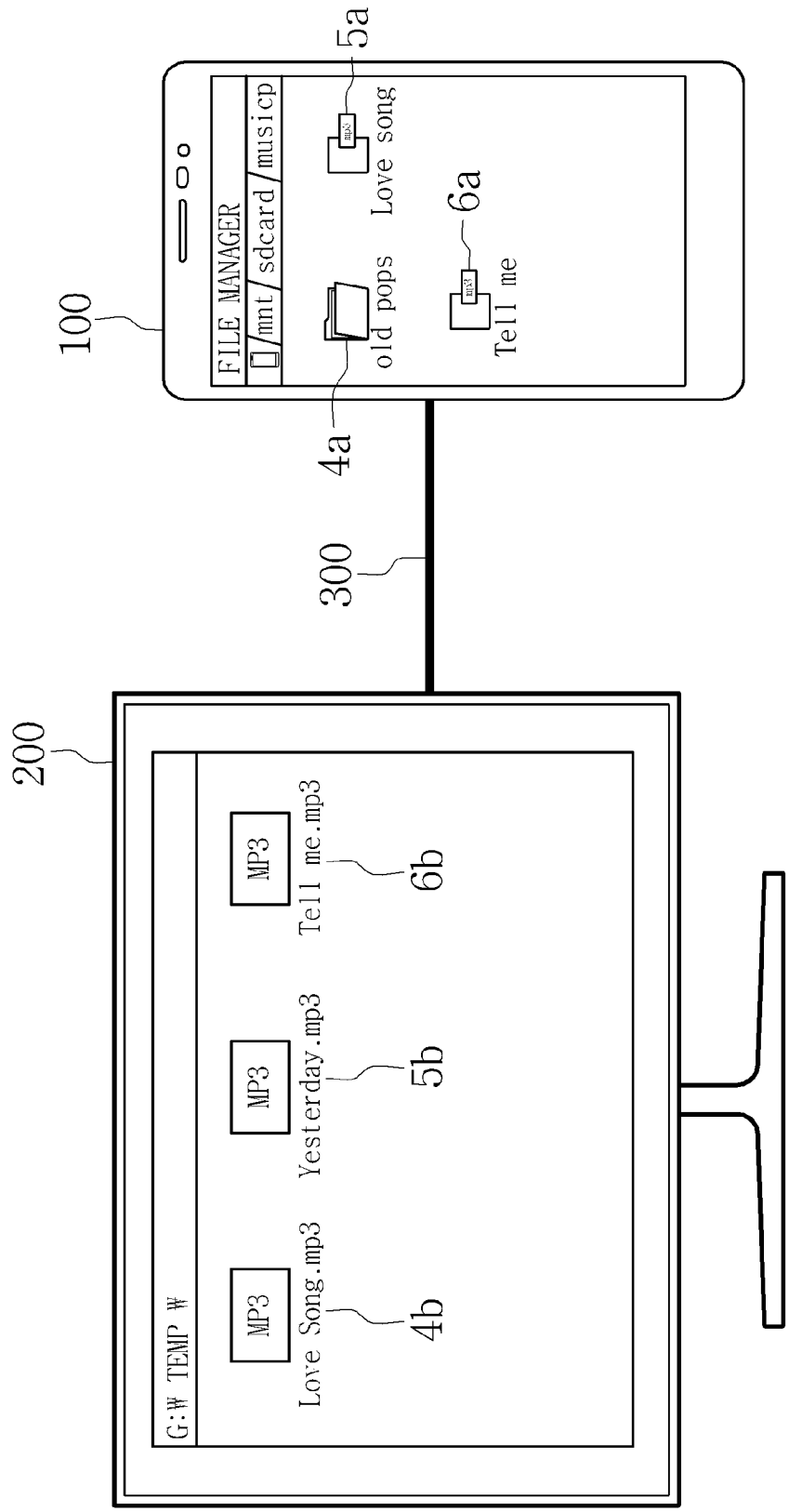

FIG. 5A and FIG. 5B are configuration diagrams of another device and a terminal illustrating the generation of related data or synchronization data according to an exemplary embodiment of the present invention. The synchronization unit 120 may store data relating to an accessed application in the temporary storage. More specifically, another file (related data) synchronized with the original file relating to the application may be created in the temporary storage.

The related data is data that is provided in the temporary storage for the user's convenience, may be regarded as a Linux® symbolic link directory or file, and represents virtual files and folders synchronized with the original file stored in the terminal. For example, virtual synchronized files synchronized with the original file "AAcamera.dat" included in "data/application/AAcamera" is created in the temporary storage (temp/AAcamera.dat). The user may perform copying, moving, deleting, changing, and the like of the original file by operating the related data created in the temporary storage.

For example, if a camera application photographing a picture is accessed, the synchronization unit 120 may create a folder and files (related data) synchronized with lower-level folders and files of a folder (in a case where application AA camera is installed, folder "data/application/AAcamera" is created in the terminal) created by the initial installation of the accessed camera application to the terminal 100 in the temporary storage 121.

The terminal 100 represented in FIG. 5A shows a screen on which a music list is displayed after the execution of application "Music Player" illustrated in FIG. 4. When music files "Love song" 1a, "Yesterday" 2a, and "Tell me" 3a are displayed in the terminal 100 as a list, the synchronization unit 120 creates related data synchronized with each music file appearing in the list in the temporary storage 121.

The related data created in the temporary storage 121 is shown through a window 1001 representing the temporary storage of the connected device 200. More specifically, the synchronization unit 120 creates related data 1b corresponding to a music file 1a, related data 2b corresponding to a music file 2a, and related data 3b corresponding to a music file 3a.

When folder "Music Player" 11b illustrated in FIG. 4 is accessed, the terminal 100 illustrated in FIG. 5B shows a screen on which lower-level folders and files thereof are displayed. Here, folder "Old Pops" 4a is present as a lower-level folder of folder "Music Player" 11b, and music file "Love song" 5a and music file "Tell me" 6a are included therein. In such a case, the synchronization unit 120 creates related data 4b, 5b, 6b corresponding to the folder and the files 4a, 5a, 6a displayed in the terminal 100 in the temporary storage 121.

Accordingly, the user may operate the original file and the folder stored in the terminal 100 by performing copying, moving, deleting, modifying, or the like of the related data 1b, 2b, 3b or 4b, 5b, 6b created in the temporary storage 121.

The synchronization unit 120 may store the related data in different lower-level folders in time order of the related data created in the temporary storage 121 or in accordance with generated applications. For example, when a user checks files 1 and 2 through an application 1 and then checks files 3 and 4 through an application 2, the related information creating unit 130 may create the files 1 and 2 in a folder 1 inside the temporary storage 121 and create the files 3 and 4 in a folder 2 other than the folder 1.

When a user is searching for a specific music file from among many files of a music list, it may be unnecessary to create related data of all the files and folders displayed in the terminal 100 in the temporary storage 121. In such a case, the synchronization unit 120 may create only related data of the specific music file selected by the user on the terminal 100 in the temporary storage 121. For example, in FIG. 5B, when the user selects only music file "Tell me 6a", only the related data 6b of music file "Tell me 6a" may be displayed in the connected device 200.

The terminal 100 may further include a relation information creating unit 130 and a grouping unit 140.

The relation information creating unit 130 may create application-to-file relation information of the name of each application stored in the terminal 100, files and folders used for executing each application, and files created through each application.

Specifically, the relation information creating unit 130 may collect path information of files and folders relating to a specific application with reference to the specific application. When an application is installed to the terminal 100, not all the files and folders relating to the application are created in a folder created by installing the application, thus the relation information creating unit 130 may collect path information of files and folders relating to the application during the installation process or the execution of the application, and the like to maintain information of the related files and folders.

For example, a cache file, a current file, and the like relating to the application may not be included in the same higher-level folder. Accordingly, the relation information creating unit 130 creates application-to-file relation information in which files stored in the terminal 100 are associated with at least one application.

When an application is installed in the terminal 100, modified in the terminal 100, or deleted from the terminal 100, a new file may be created through an application, and when the terminal 100 performs media scanning, the relation information creating unit 130 may update the application-to-file relation information that has already been created.

More specifically, when there is a change in a file or a folder stored in the terminal 100, the relation information creating unit 130 may update the relation information by recreating the relation information. For example, when a new application is installed, an application is updated, or an application is deleted, a text, a photograph, a motion picture, a sound file, or the like may be generated through the application. The terminal 100 may perform the media scanning when the terminal 100 is connected to the device 200 or the connection is released. Further, the media scanning may be performed during the booting process of the terminal 100 after the terminal 100 is turned on, and the like.

Figure 6:
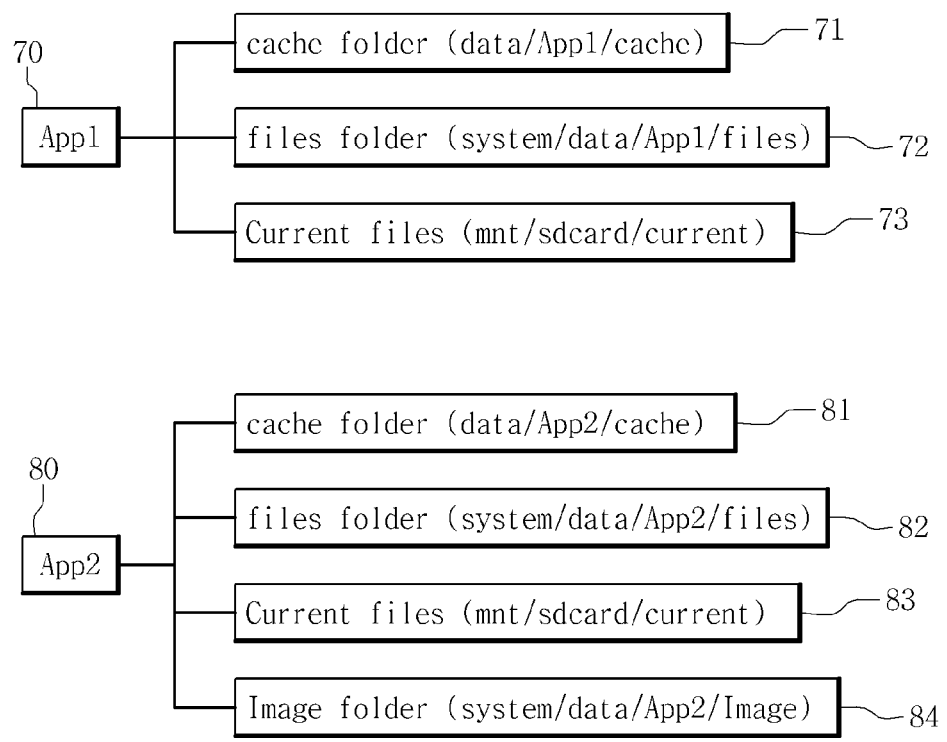
FIG. 6 is a structure diagram illustrating a data structure grouped by a grouping unit of a terminal according to an exemplary embodiment of the present invention.

FIG. 6 is a structure diagram illustrating a data structure grouped by a grouping unit of a terminal according to an exemplary embodiment of the present invention. As illustrated in FIG. 6, a "cache" folder 71, a "files" folder 72, and "current" files 73 relating to an application1 70 (hereinafter, referred to as "APP1 70") are grouped with reference to the APP1 70.

As illustrated in FIG. 6, the top-level folder of the "cache" folder 71 is "data" folder, the top-level folder of the "files" folder 72 is "system" folder, and the top-level folder of the "current" file 73 is "mnt" folder. The folders relating to the APP1 70 are stored in different top-level folders but are grouped with reference to the APP1 70.

The application-to-file relation information creating unit 130 collects and checks path information of files and folders relating to the APP1 70 and creates application-to-file relation information, and the grouping unit 140 groups files and folders with reference to the APP1 70 by using the relation information. The grouping of the files stored in the terminal may be performed based on the relation information and an identification of the APP1 70.

As illustrated in FIG. 6, an application2 80 (hereinafter, referred to as "APP2 80"), files 83 and folders 81, 82 relating to the APP2 80 appear as a grouped file/folder. Unlike the APP1 70, the APP2 80 further includes an "image" folder 84. For example, the APP2 80 is an application for photographing pictures, the "image" folder 84 may be a space in which image files generated by photographing using the APP2 80 are stored.

The grouping unit 140 may classify the files and folders grouped with reference to associated applications in accordance with the types of the files. Here, the type of a folder may be classified in accordance with the type of files included in the folder. For example, the type of files may include at least one of a general file, a cache file, an image file, a motion picture file, a text file, and a security file.

Figure 7:
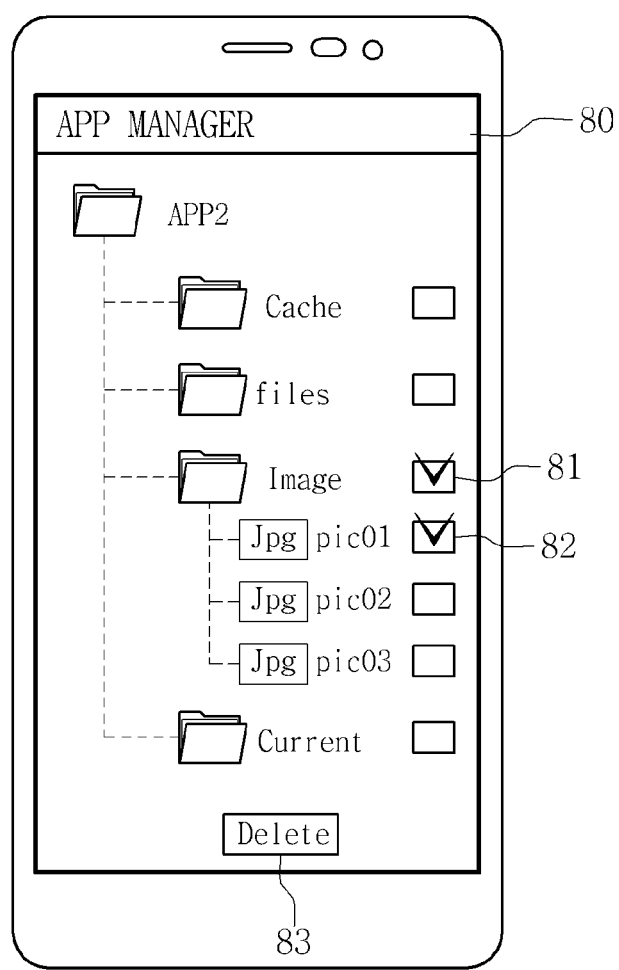
FIG. 7 is a configuration diagram illustrating a structure of files and folders of APP2 illustrated in FIG. 6 according to an exemplary embodiment of the present invention.

FIG. 7 is a configuration diagram illustrating a structure of files and folders of the APP2 illustrated in FIG. 6 according to an exemplary embodiment of the present invention. An application manager (APP MANAGER) 80 illustrated in FIG. 7 may be one type of application managing files and folders stored in the terminal 100 with reference to applications stored in the terminal 100. A user may check and manage files and folders relating to each application stored in the terminal 100 through the application manager 80.

As illustrated in FIG. 7, as image files generated through the APP2, "pic01", "pic02", and "pic03" are included in "Image" folder. If a user desires to delete files "pic01" and "pic02", the user may selectively delete checked files by checking check boxes 81 and 82 and selecting a "Delete" button 83.

If the terminal 100 includes the relation information creating unit 130 and the grouping unit 140 as described above, the synchronization unit 120 of the terminal 100 may search for an application unit corresponding to an accessed application and create related data of files and folders included in the retrieved application unit in the temporary storage 121.

For example, when the APP2 (application unit) is accessed in a state in which the terminal 100 is connected to another device 200, the synchronization unit 120 may create related data of the "cache" folder" 81, the "files" folder 82, the "Current" files 83, and the "Image" folder 84, which are illustrated in FIG. 6, in the temporary storage 121. In such a case, the user may manage all the files and folders relating to the APP2 through the connected device 200.

Further, the synchronization unit 120 may create related data synchronized with at least one of an image file, a motion picture file, a music file, and a text file among original data related to an accessed application in the temporary storage 121. In practical use, there are many cases where a user connects the device 200 to the terminal 100 so as to search for an image file or the like stored in the terminal 100, and a system file relating to the system or the execution of an application, a secured file, or the like may not be searched.

Further, the terminal 100 may include a related data managing unit (not illustrated). When the related data created in the temporary storage 121 is copied, moved, or deleted by a user input through the connected device 200, the related data managing unit may process the original data to be copied, moved, or deleted in the same manner.

Further, if the original data of the related data relates to at least one or more of other applications and the system maintenance and complementation of the terminal, the related data managing unit may have user confirmation before the related data is moved or deleted. For example, the movement or the deletion of a file relating to the execution of a plurality of applications or a file that is essential to the system maintenance and security may cause an error in the execution of the terminal 100, and accordingly, the movement and the deletion of such significant files may be confirmed by the user with a warning message.

Figure 8:
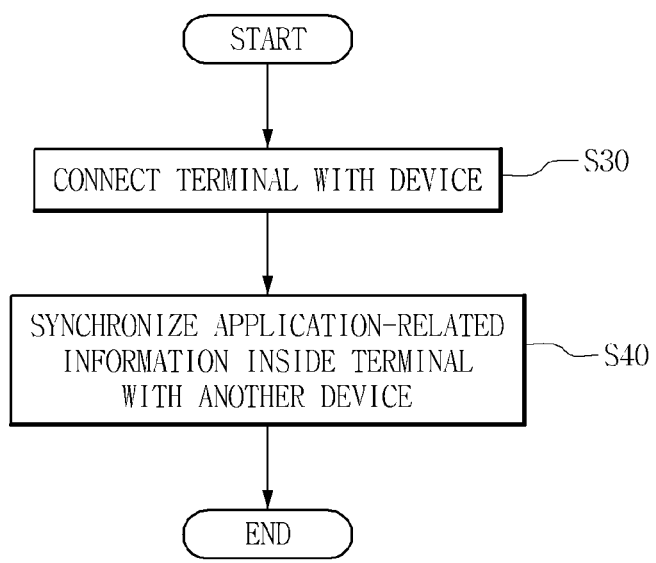
FIG. 8 is a flowchart illustrating a method for providing files associated with an application stored in a terminal through an application accessed according to an exemplary embodiment of the present invention.

FIG. 8 is a flowchart illustrating a method for providing files associated with an application stored in a terminal through an accessed application according to an exemplary embodiment of the present invention. The method may also provide application-related data for effective application related data management. As illustrated in FIG. 8, the method of providing application-related data includes process S30 in which a terminal and another device are connected to each other and process S40 in which, when the terminal is connected to the other device, related data of an application that is in the middle of execution in the terminal or an application selected by a user after the connection is extracted, and the extracted related data is synchronized with the connected device.

The terminal may be connected to an external device through a wired or wireless network, and, in the case of a wired network, the connection may be made through the USB. If the connection is established through a wireless network, a near field wireless communication methods may be used, e.g., a Wireless Local Area Network, IEEE 802.16 protocol, Bluetooth®, and the like.

In process S30, a temporary storage may be generated for temporal storage of application-related data, files, and folders. A default mounted folder may exist in the terminal, the mounting function of the default mounted folder may be cancelled, and the generated temporary storage may be converted into a basic mounted folder. In such a case, when internal files of the terminal are searched through the connected device, the temporary storage may appear as the top-level folder.

Further, process S40 of synchronizing the related data of an application inside the terminal may include executing an application in response to a user input or accessing an application folder selected through a file manager or the like inside the terminal. Here, the file manager may be a file management application for searching for files and folders inside the terminal, and the application folder, which is a folder created by installing a specific application to the terminal, may represent a space in which main files relating to the execution of the installed application are stored.

The related data may represent data synchronized with original data relating to the accessed application. The original data may be a file or a folder displayed on the terminal through the accessed application. The original data may be a file or a folder selected by a user among files or folders displayed on the terminal through a final manager or the like. The file displayed on the terminal may be at least one of an execution file, an image file, a music file, a motion picture file, a flash file, and a text file.

Figure 9:
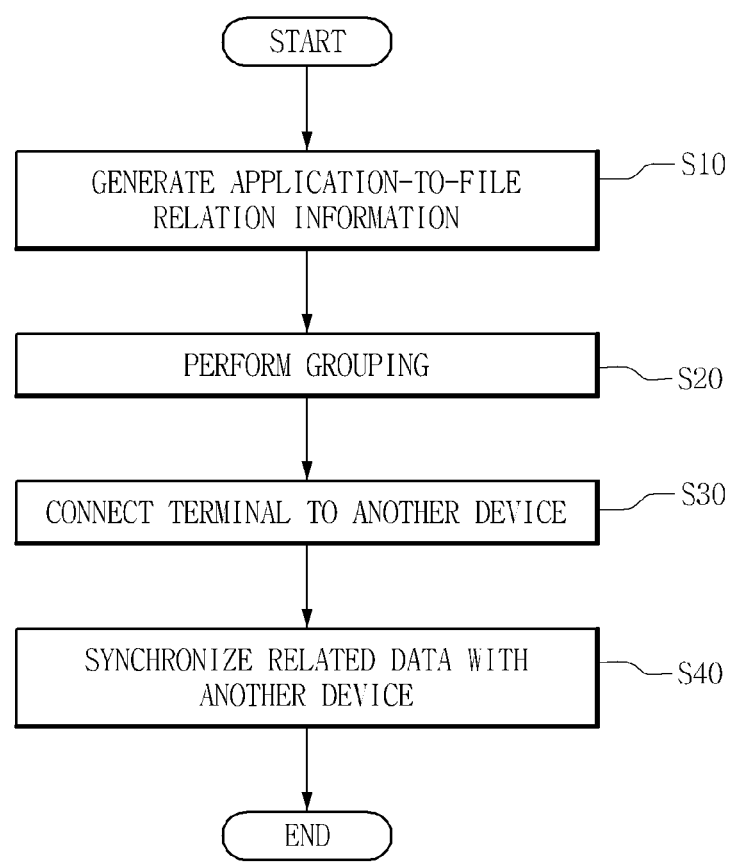
FIG. 9 is a flowchart illustrating a method for providing files associated with an application stored in a terminal through an application accessed according to an exemplary embodiment of the present invention.

FIG. 9 is a flowchart illustrating a method for providing files associated with an application stored in a terminal through an application accessed according to an exemplary embodiment of the present invention. The method may provide application-related data. The method of providing application-related data may include generating application-to-file relation information (process S10), and grouping files stored in the terminal in units of corresponding applications based on the application-to-file relation information (process S20).

In the process S10, the application-to-file relation information includes information of paths of all the files and folders relating to a specific application as information of the relation of the name of each application stored in the terminal, files and folders used for executing each application, and files and folders created through each application.

Further, in the process S10, the generating of the application-to-file relation information may include a process of recreating the created application-to-file relation information if an application is installed, modified, or deleted, if a new file is created through an application, and/or if the terminal performs media scanning. Accordingly, the relation information may be updated when a change in a file or a folder stored in the terminal occurs or is estimated to occur (for example, when the power of the terminal is turned on, when an MTP connection is made and then is cancelled, or the like).

In the process S20, the grouping of files stored in the terminal in units of corresponding applications based on the application-to-file relation information may include classifying grouped files in accordance with the types of files, and the type of files to be classified may include at least one of a general file, a cache file, an image file, a motion picture file, a text file, and a security file. By classifying files in accordance with the types within the grouped application unit, it may be simplified to create selective related data in accordance with the type of a file.

The generation of the relation information and the grouping may be performed when the terminal 100 is connected to another device 200. Further, the generation of the relation information and the grouping may be performed in advance before the connection and consecutively performed again after the connection. For example, when image files relating to an application 3 is searched for, an image folder or files may be classified in advance in accordance with the types in a lower-level folder of the application 3, and accordingly, the synchronization unit may generate only data relating to the image files in a speedy manner.

In process S40, a synchronizing of the related data with another device may include a process of searching for an application unit corresponding to an accessed application and creating related data of files and folders included in the retrieved application unit in the arbitrary storage. As described above, by grouping data stored inside the terminal in units of applications, an access path for accessing data relating to an application is simplified, and the data processing speed may increase.

Further, in the process S40, the synchronizing of the related data may be performed such that related data synchronized with at least one of an image file, a motion picture image, a music file, and a text file among the original data is created in the temporary storage.

Further, the method for providing application-related data may further include performing user confirmation before the modification, relocation, or the deletion of related data if the related data is data relating to at least one of another application and the terminal system maintenance and complementation.

Figure 10:
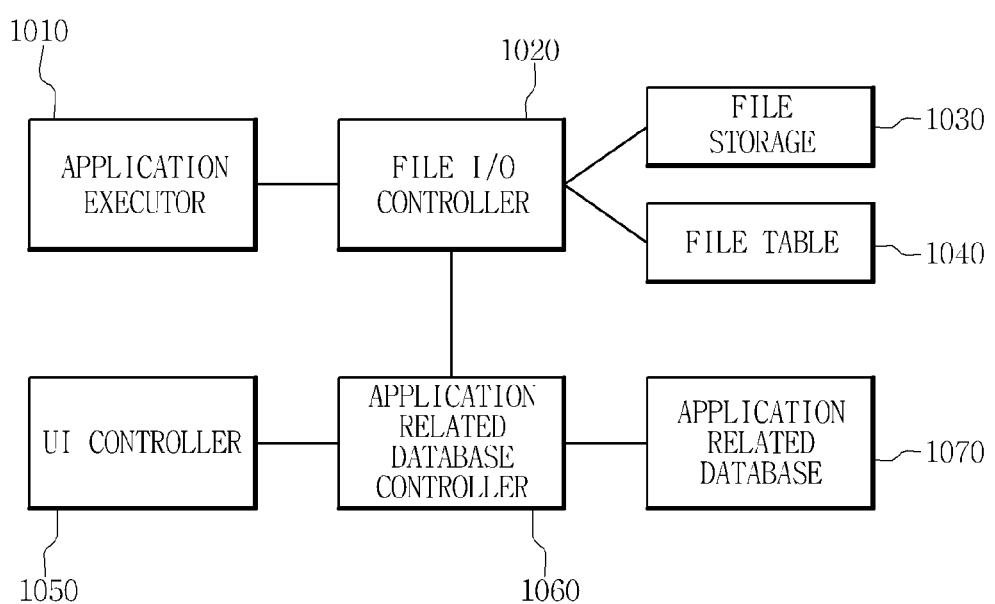
FIG. 10 is a diagram illustrating a file management system according to an exemplary embodiment of the present invention.

FIG. 10 is a diagram illustrating a file management system according to an exemplary embodiment of the present invention.

Referring to FIG. 10, the file management system may include an application executor 1010, a file input/output (I/O) controller 1020, a file storage 1030, a file table 1040, a user interface (UI) controller 1050, a database controller 1060, and a database 1070. The file management system may be configured in a mobile terminal or a portion of the file management system may be implemented in a mobile terminal and another portion of the file management system may be implemented in an external device communicating with the mobile terminal.

The application executor 1010 controls an execution of an application installed in the mobile terminal and generates application execution information such that the file I/O controller 1020 recognizes the application execution information. The application execution information may include an identity of the application, an execution start time, an execution termination time, and/or an execution status of the application. Further, the application executor 1010 may recognize an installation or an uninstallation of the application, and the file I/O controller 1020 may recognize files and folders to be created or to be deleted based on the installation/uninstallation of the application. Accordingly, the file I/O controller 1020 may control creation, modification, or deletion of files and folders in the mobile terminal based on installation, uninstallation, and execution information of an application.

The file storage 1030 stores, modifies, or deletes the created files and folders of an application according to the control of the file I/O controller 1020. The file table 1040 may maintain and update a file table including file information of the mobile terminal. The file table is created or updated if a media scanning process is performed by a media scanner of the mobile terminal and the media scanning process may be performed during a booting process of the mobile terminal or an MTP connection and/or MTP release, and the like. The file table 1040 may be stored in a storage device of the file storage 1030 or may be stored in a separate storage device. The UI controller 1050 may control a user interface to be displayed on a touch screen display or to be output to other types of user interfaces.

The UI controller 1050 may display file managing interfaces according to various embodiments illustrated herein. The database controller 1060 may maintain a database including application-related data for each application. More specifically, the database controller 1060 controls creation, modification, and deletion of files and folders associated with an application and maintains information of the associated application for the files and folders such that the files and folders are retrieved and displayed as files and folders of the application. The database 1070 may store data generated and updated by the database controller 1060, e.g., data indicating files and folders created, modified, and deleted by each application.

Figure 11:
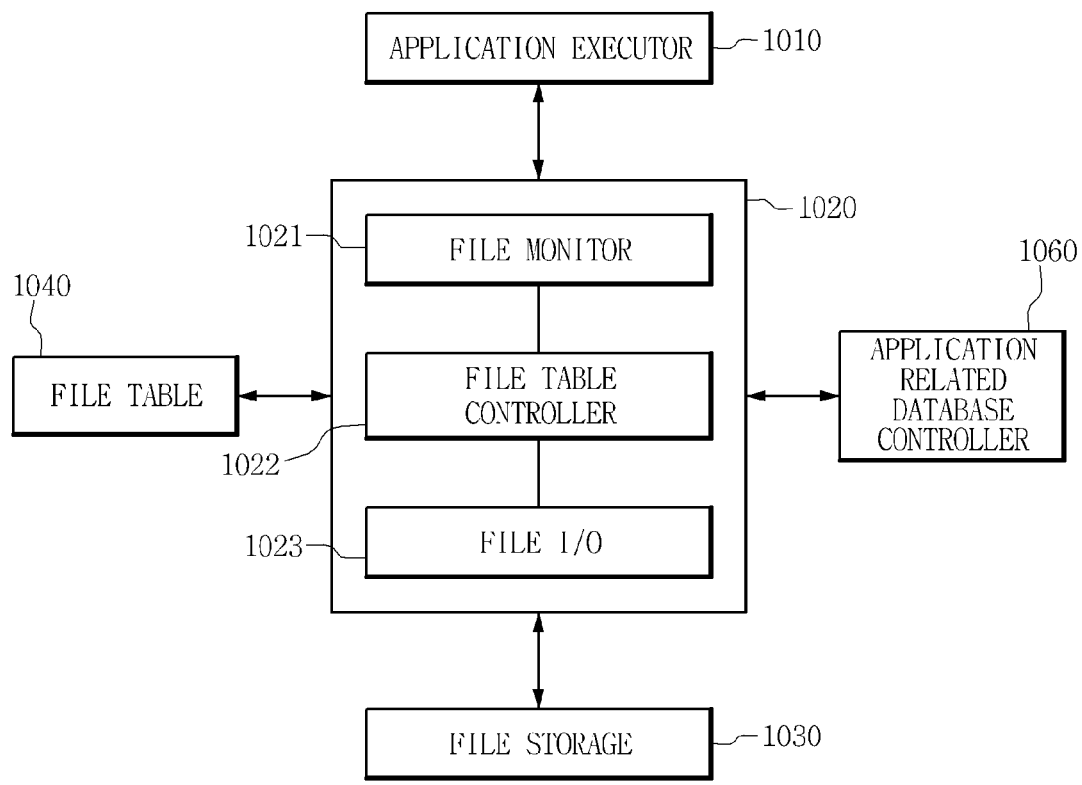
FIG. 11 is a diagram illustrating a file I/O controller according to an exemplary embodiment of the present invention.

FIG. 11 is a diagram illustrating a file I/O controller according to an exemplary embodiment of the present invention. The file I/O controller 1020 of FIG. 10 may be the file I/O controller of FIG. 11, but is not limited thereto. Referring to FIG. 11, the file I/O controller may include a file monitor 1021, a file table controller 1022, and a file I/O 1023. The file monitor 1021 receives a file I/O request and transmits the file I/O request to the file I/O 1023. The file monitor 1021 may monitor requests for creation, modification, or deletion of a file or folder. The file I/O creates, modifies, or deletes a file or folder according to the monitored requests. The file table controller 1022 may compare a file table stored in the file table 400 with the data stored in the database 1070.

Figure 12:
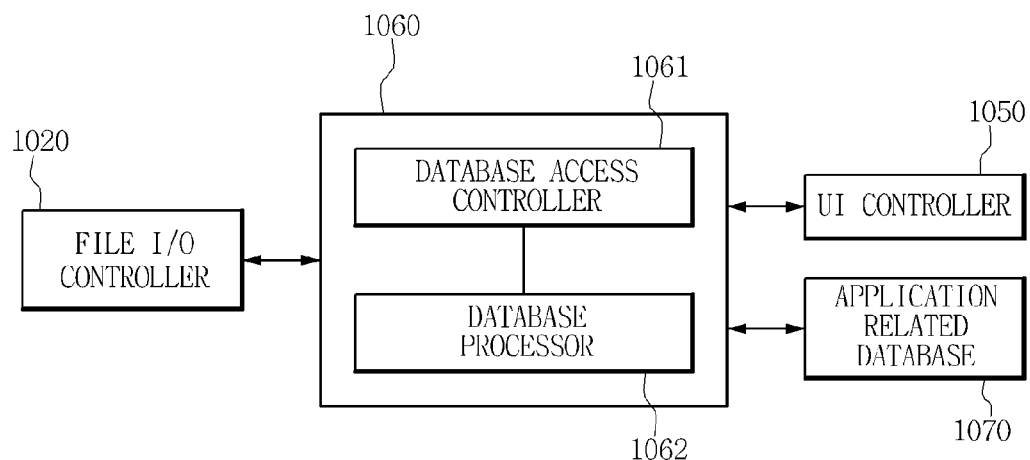
FIG. 12 is a diagram illustrating a database controller according to an exemplary embodiment of the present invention.

FIG. 12 is a diagram illustrating a database controller according to an exemplary embodiment of the present invention. The database controller 1060 of FIG. 10 may be the database controller of FIG. 12, but is not limited thereto. Referring to FIG. 12, the database controller may include a database access controller 1061 and a database processor 1062. The database access controller 1061 may transmit a request for comparing file table, e.g., the file table stored in the file table 1040 of FIG. 10, with application-related data stored in the database, e.g., the database 1070 of FIG. 10. The database processor 1062 may process input/output of the database 1070.

Referring to FIG. 10, FIG. 11, and FIG. 12, if an application install is determined, an application executor, e.g., the application executor 1010 of FIG. 10, may retrieve application information of the application to be installed, and a file I/O controller, e.g., the file I/O controller 1020 of FIG. 10, may initiate a monitoring for recognizing files and/or folders to be stored in the mobile terminal.

If a file (or a folder) creation is requested during the installation process of the application, a file monitor, e.g., the file monitor 1021 of FIG. 11, may monitor creating files and folders and obtain information of the creating files and folders relating to the installing application. If the information of the creating files and folders is obtained, the file I/O controller may transmit the obtained information of the creating files and folders and the application information of the application to a database controller, e.g., the database controller 1060 of FIG. 10. More specifically, a file writing operation may be determined and monitored and the creating files and/or folders may be retrieved.

The database controller stores the obtained information of the creating files and folders and the application information of the application in a database, e.g., the database 1070 of FIG. 10. The database controller may store the obtained information of the creating files and folders and the application information of the application as application-related data associated with the installing application and/or may process processed application-related data based on the obtained information of the creating files and folders and the application information of the application.

The processed application-related data may include a package name indicating the name of the installing application package, a file path indicating the path of the creating files and/or folders, a file type indicating whether the creating file is a cache file, a non-cache file, or a file of another type, a shared field indicating whether the creating file and/or folder is associated with other applications other than the installing application. Further, the file I/O controller may store the creating files and folders in a file storage, e.g., the file storage 1030 of FIG. 10, and finalize the installation process. Accordingly, the database 1070 may store application-related file information indicating stored files and/or folders associated with an installed application and all files and folders relating to the installed application may be recognized based on a retrieval of the application-related file information.

If an application uninstallation is requested by a user, the application executor 1010 may retrieve information of the application to be uninstalled. The file I/O controller 1020 may request information of files and/or folders relating to the application to be uninstalled, and the database controller 1060 may search for files and folders relating to the package name of the application to be uninstalled. The database access controller 1061 may search for the files and folders relating to the package name of the application based on information stored in the database 1070. During the uninstallation process, cache files associated with the application to be uninstalled may be recognized and deleted and other types of files related to the application to be uninstalled may be provided to UI controller 1050. The provided file information may be a list of files related to the application and may be displayed as tree-type folders and files shown in FIG. 6. However, unlike FIG. 6, cache folder may not be displayed if the cache folder and cache files were deleted. Further, files and folders generated during the installation process may be deleted automatically during the uninstallation process. Files and folders generated during the execution of the application may be deleted based on a user's selection, but aspects are not limited as such. The files and folders generated during the execution of the application may be deleted automatically during the uninstallation process. Selected files may be deleted and unselected files may be protected (or selected files may be protected from deletion and unselected files may be deleted) while uninstalling the application. Shared files relating to at least one other application may not be deleted during the uninstallation process. If the application uninstallation is completed and no files relating to the application exist, the application-related file information in the database may be removed. If a file relating to the application exists without deletion after completing the uninstallation of the application, the database processor 1062 may update application related file information. Accordingly, files and folders relating to uninstalled application may be retrieved based on the updated application related file information. Further, if a file is related to another application other than the application to be uninstalled, the file may not be deleted when the application is uninstalled and the association between the file the uninstalled application may be released. For example, if a shared file 1 is associated with application 1 and application 2, the shared file 1 becomes a non-shared file if application 1 is uninstalled and only application 2 is installed in the mobile terminal by releasing the association relationship between the shared file 1 and the application 1.

File I/O controller 1020 may delete files to be deleted from the file storage 1030. The files to be deleted may be determined based on a list generated based on the application related file information stored in the application related database 1070. The files to be deleted may also be determined based on the user selection of files to be deleted.

The file monitor 1021 may monitor creation, deletion of files or folders. If a file is created or modified during an execution of an application, the file monitor 1021 reports the information of the created or modified file and the executed application to database controller 1060. Accordingly, the database controller 1060 may update database 1070 such that files and folders created or modified during an execution of an application are associated with the executed application. In addition, the file I/O 1023 may perform file creation or modification on the file storage 1030.

During a media scanning process, all files stored in a mobile terminal may be scanned and a file table may be configured in a file table 1040. The media scanning process may be performed when the mobile terminal is booted or the mobile terminal is connected to and/or disconnected from another device using USB, MTP, or PTP connections. The file table may not include application related file information, such as association information between an application and a file created during the execution of the application. Since the file table may include information similar to the application related files and folders or association information between a file and an application, the file table and data stored in the database 1070 may be compared and data stored in the database 1070 may be updated based on the comparison result. More specifically, if there is a change in the file table after a media scanning process and it is determined that there is a discrepancy between the file table and the data stored in the database 1070, the database 1070 may be updated.

The UI controller 1050 may display files and folders associated with an application after retrieving application-file association data stored in the database 1070. As shown in FIG. 6, files and folders created or modified when application 2 is installed or executed may be displayed under application 2 as a tree-structure or other structures. Each item may be selected for deletion or protection. Based on the application-file association data stored in the database 1070, all files and folders associated with the application 2 may be displayed in a reconfigured format even though the files are dispersed in different locations of memories or different folders. Files and folders not associated with the application 2 may not be displayed along with files and folders associated with the application 2 such that only files and folders relating to application 2 are displayed as a tree-structure or other structural types.

Folders of different applications may be displayed by the UI controller 1050. For example, a first folder for application 1, a second folder for application 2, and a folder for application 3 may be displayed. In this user interface, if the first folder is selected, a cache folder including cache files of the application 1, a data folder including data files of the application 1, and a file folder including application files of the application 1 except cache files and data files of the application 1 may be displayed, for example.

Figure 13:
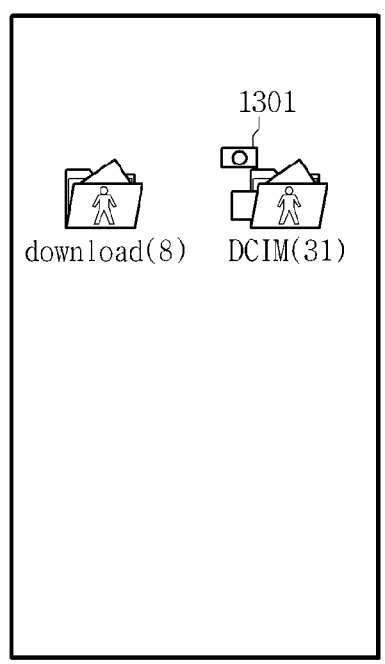
FIG. 13 is a diagram illustrating a user interface indicating an associated application for a folder or a file according to an exemplary embodiment of the present invention.

FIG. 13 is a diagram illustrating a user interface indicating an associated application for a folder or a file according to an exemplary embodiment of the present invention. If folders and files are displayed without sorting files based on each application, an application icon may be displayed around a file to indicate the file is associated with an application. For example, if picture files stored in DCIM folder are created by a camera application, a camera icon 1301 indicating the camera application may be displayed along with DCIM folder or picture images created by the camera application.

Figure 14:
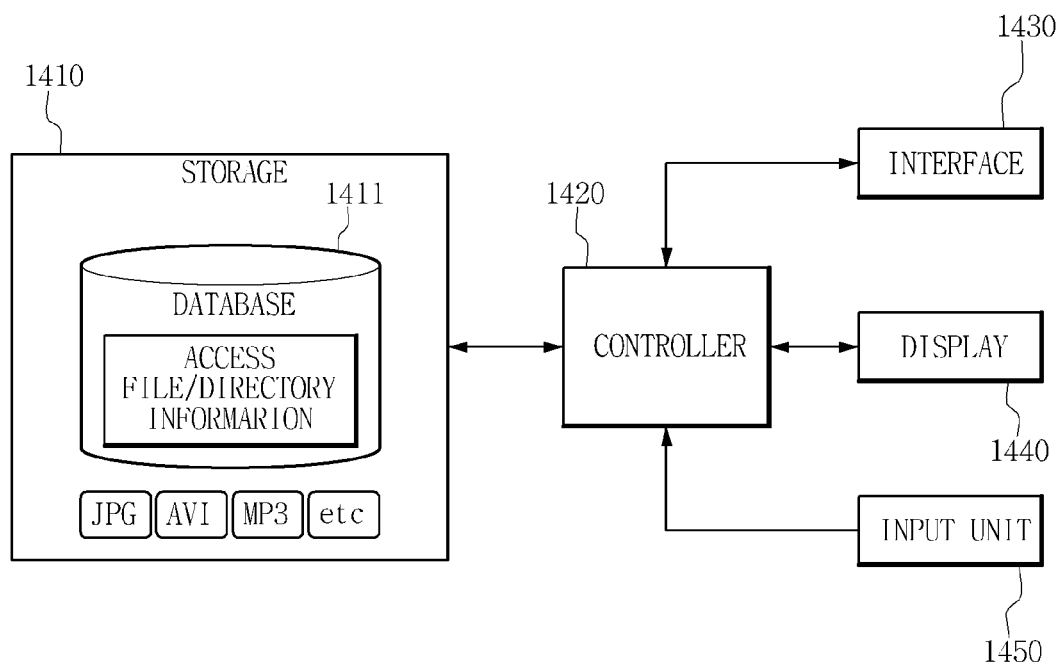
FIG. 14 is a diagram illustrating a mobile terminal to provide a file mounting control operation according to an exemplary embodiment of the present invention.

FIG. 14 is a diagram illustrating a mobile terminal to provide a file mounting control operation according to an exemplary embodiment of the present invention.

Referring to FIG. 14, the mobile terminal may include a storage 1410, a controller 1420, an interface 1430, a display 1440, and an input unit 1450. The storage 1410 may be a memory in which many types of data are stored, such as JPEG, AVI, MP3, and the like. The database 1411 may include a database 1411 that stores application access file/directory information. The application access file information indicates a file, a folder, or a directory to which an application accesses. Further, the application access file information may indicate the identity of the application, which accesses a file, a folder, or a directory. The interface 1430, the display 1440, and the input unit 1450 may perform inputs and outputs of various data under the control of the controller 1420, and may perform similar functions of the interfaces and displays illustrated above. The input unit 1450 may include a touch keypad, touch screen input interface, key buttons, voice input interfaces, and the like.

If an external device, such as a personal computer, is physically or wirelessly connected to the mobile terminal, the mobile terminal and the external device establishes a communication setup according to a protocol, such as an MTP connection. A user of the mobile terminal may manipulate the mobile terminal after the communication setup and accesses a file, a folder, or a directory. The user may execute an application and may access a file, a folder, or a directory using the executed application. The database 1411 may store a history of file access and the file access information may be transmitted to the connected external device such that the external device displays the file, folder, or directory accessed by the user of the mobile terminal. The accessed files may be stored in a temporary directory, and the temporary directory may be mounted to the external device while maintaining the connection. If the user of the mobile terminal accesses different files or folders using an executed application, the changed access to different files may be updated in the temporary directory such that the connected external device displays changed files, folders, or directories. The controller 1420 updates files, folders, or directories to be stored in the temporary directory that is mounted to the connected device according to the real time access of files, folders, or directories by an application of the mobile terminal.

Figure 15:
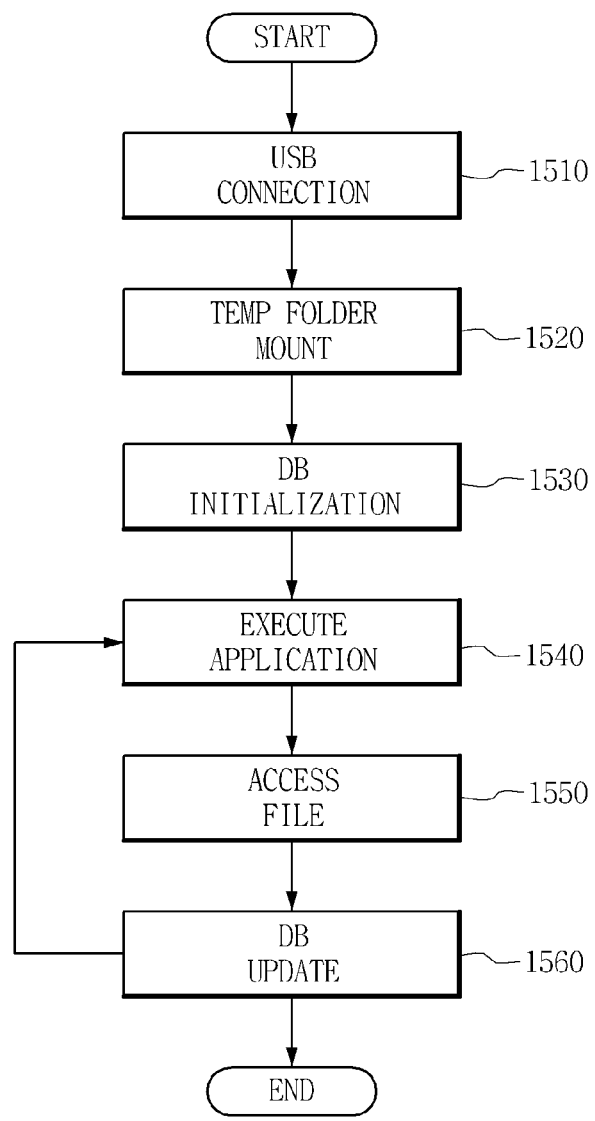
FIG. 15 is a flowchart illustrating a method for providing a file mounting control operation according to an exemplary embodiment of the present invention.

FIG. 15 is a flowchart illustrating a method for providing a file mounting control operation according to an exemplary embodiment of the present invention.

Referring to FIG. 15, a mobile terminal may be connected to an external device (operation 1510). The connection may be a connection using a USB, a micro USB, or other types of connections. If the connection is established according to a protocol, such as MTP connection, a temporary directory may be mounted to the external device (operation 1520) and a database of the mounted directory may be initialized (operation 1530). The mobile terminal and the external device, when connected to each other, may perform a transmission protocol setting process. The file system of the external device may receive file information from the mobile terminal. The external device provides a directory relating to the transmission protocol and displays the directory on a display of the external device. The directory corresponds to the mounted directory of the mobile terminal. If a user executes an application in the mobile terminal (operation 1540) and accesses a file (operation 1550), the database of the accessed file is updated in the mounted directory (operation 1560). Accordingly, the external device may display the updated files on a display of the external device and manipulates the mounted files. Accordingly, a user may manipulate the mobile terminal and the external device simultaneously and manages files and folders of the mobile terminal such that files may be managed from the mobile terminal and the external device by utilizing the mounted directory that updates the access file information in real-time.

Figure 16:
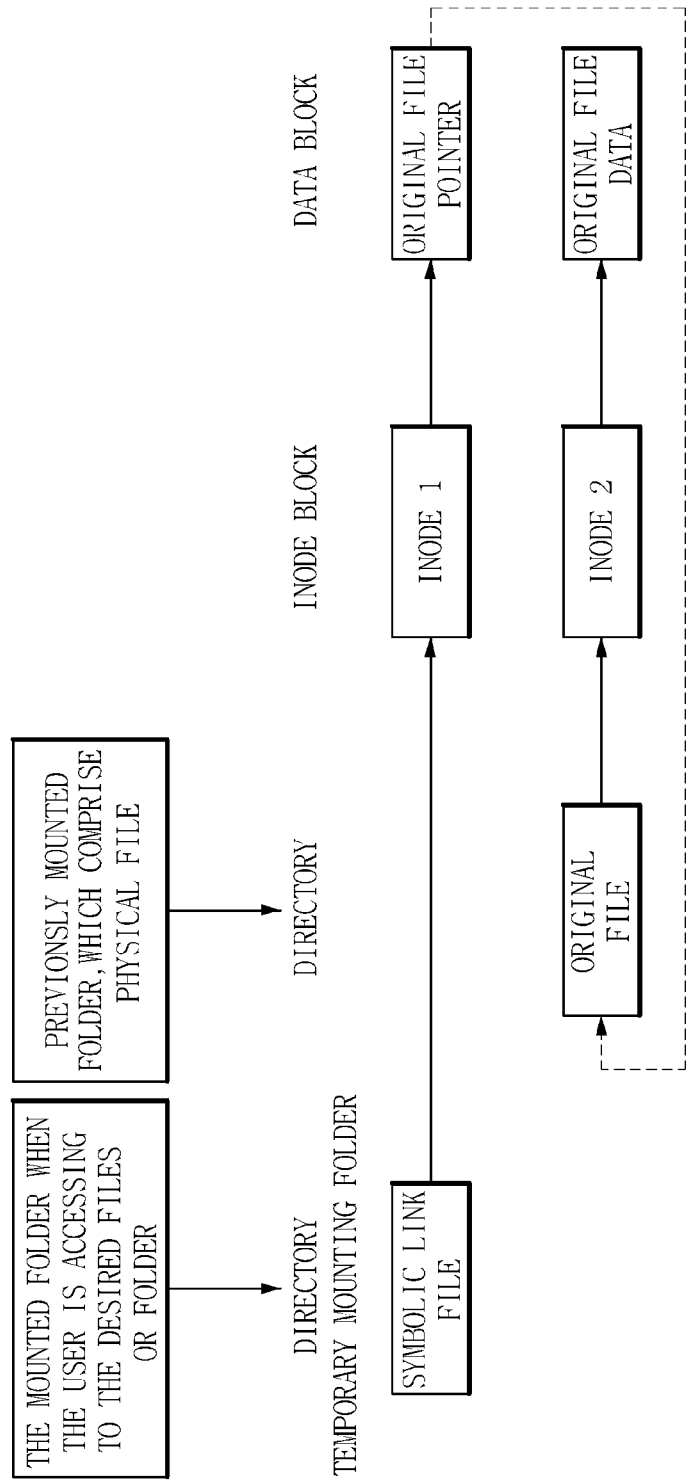
FIG. 16 is a diagram illustrating a mounting folder structure according to an exemplary embodiment of the present invention.

FIG. 16 is a diagram illustrating a mounting folder structure according to an exemplary embodiment of the present invention.

The mounting directory may be newly generated temporary mounting directory. More specifically, a default mounting directory may be mounted when an external device is connected with a mobile terminal. If a file or a folder is accessed by an application, the mounted default mounting directory may be released and the temporary mounting directory may be mounted and database initialization for the temporary mounting directory may be performed. The files and folders accessed by a user of the mobile terminal, which has been configured in a database, may be associated with the temporary mounting directory using e.g., a symbolic link directory. A link folder or a file may be generated in the temporary mounting directory. If a user accesses a file, a folder, or a directory using an executed application, virtual file system (VFS) parses accessed file, folder, or directory and/or types thereof. When a user attempts an access to a file, physical file may be accessed via a VFS layer. A file or a folder accessed by a user using an application may be added to a database and may be utilized by application framework layer, transport layer, and the like.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method that uses a controller to provide application-related data, the method comprising:
   connecting a mobile terminal and a device;
   determining an object displayed on the mobile terminal;
   determining a data file associated with the object; and
   controlling, by the controller, the data file associated with the object to be accessible by the connected device and controlling information of the data file to be displayed on a display of the connected device according to the determination of the object,
   wherein: the data file comprises at least one of a file and a folder;
   the data file associated with the object is stored in a real-time mounting directory according to the determination of the object;
   the real-time mounting directory is mounted to the connected device;
   the data file associated with the object is removed from the real-time mounting directory according to a selection of another object.

2. The method of claim 1, wherein the data file is separately controllable by the connected device by selecting the displayed information of the data file using a user input interface of the connected device.

3. The method of claim 1, wherein
   a data file associated with the other object is stored in the real-time mounting directory according to the selection of the other object.

4. The method of claim 1, wherein the real-time mounting directory is located at a memory of the mobile terminal.

5. The method of claim 1, wherein the object is a file or a folder selected by a user of the mobile terminal.

6. The method of claim 1, wherein the object is an application selected by a user of the mobile terminal.

7. The method of claim 6, further comprising:
   retrieving files and folders associated with the selected application; and
   displaying the files and folders associated with the selected application on at least one of the mobile terminal and the connected device.

8. The method of claim 1, further comprising:
   executing a first application on the mobile terminal;
   displaying a plurality of data files associated with the first application on the mobile terminal;
   selecting a first data file from the plurality of data files; and
   displaying information of the first data file on the display of the connected device.

9. The method of claim 1, further comprising:
   releasing a default mounting folder and mounting a temporary mounting folder to the connected device, the temporary mounting folder configured to mount the data file associated with the object to the connected device in real-time.

10. A mobile terminal to provide application-related data, comprising:
    a display to display an image;
    a connector to connect to a device; and
    a controller to determine an object displayed on the display of the mobile terminal, to determine a data file associated with the object, to control the data file associated with the object to be accessible by the connected device, and to control information of the data file to be displayed on a display of the connected device according to the determination of the object,
    wherein: the data file comprises at least one of a file and a folder;
    the data file associated with the object is stored in a real-time mounting directory according to the determination of the object;
    the real-time mounting directory is mounted to the connected device;
    the data file associated with the object is removed from the real-time mounting directory according to a selection of another object.

11. The mobile terminal of claim 10, wherein the data file is separately controllable by the connected device by selecting the displayed information of the data file using a user input interface of the connected device.

12. the mobile terminal of claim 10, wherein
    a data file associated with the other object is stored in the real-time mounting directory according to the selection of the other object.

13. The mobile terminal of claim 10, wherein the real-time mounting directory is located at a memory of the mobile terminal.

14. The mobile terminal of claim 10, wherein the object is a file or a folder selected by a user of the mobile terminal.

15. The mobile terminal of claim 10, wherein the object is an application selected by a user of the mobile terminal.

16. A device to provide application-related data, comprising:
- a display to display an image;
- a connector to connect to a mobile terminal; and
- a controller to mount a real-time mounting directory of the mobile terminal, to determine a data file associated with an object from the real-time mounting directory, to control the data file associated with the object to be mounted to the device, and to control information of the mounted data file to be displayed on the display of the device according to the determination of the object,
- wherein: the object is displayed on the mobile terminal, and contents stored in the real-time mounting directory are changed according to the determination of the object;
- the data file comprises at least one of a file and a folder;
- the data file associated with the object is stored in a real-time mounting directory according to the determination of the object;
- the data file associated with the object is removed from the real-time mounting directory according to a selection of another object.

17. The device of claim 16, wherein the mounted data file is separately controllable by the device by selecting the displayed information of the mounted data file using a user input interface of the device.

* * * * *